(12) United States Patent
Hess (10) Patent No.: US 9,195,850 B2
(45) Date of Patent: *Nov. 24, 2015

(54) SYSTEM, METHOD AND COMPUTER PROGRAM PRODUCT FOR SHARING A SINGLE INSTANCE OF A DATABASE STORED USING A TENANT OF A MULTI-TENANT ON-DEMAND DATABASE SYSTEM

(71) Applicant: salesforce.com, inc., San Francisco, CA (US)

(72) Inventor: Ronald Vance Hess, Monte Sereno, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/197,154

(22) Filed: Mar. 4, 2014

(65) Prior Publication Data

US 2014/0188939 A1 Jul. 3, 2014

Related U.S. Application Data

(63) Continuation of application No. 13/021,669, filed on Feb. 4, 2011, now Pat. No. 8,713,043.

(60) Provisional application No. 61/309,312, filed on Mar. 1, 2010.

(51) Int. Cl.
*G06F 17/30* (2006.01)
*G06F 21/62* (2013.01)

(52) U.S. Cl.
CPC ...... *G06F 21/6218* (2013.01); *G06F 17/30389* (2013.01)

(58) Field of Classification Search
CPC .............. G06Q 10/10; H04L 29/08936; G06F 17/30867
USPC .................................. 707/9, 781, 10, 1/1, 655
See application file for complete search history.

(56) References Cited

U.S. PATENT DOCUMENTS

| 5,577,188 | A | 11/1996 | Zhu et al. |
| 5,608,872 | A | 3/1997 | Schwartz et al. |
| 5,649,104 | A | 7/1997 | Carleton et al. |
| 5,715,450 | A | 2/1998 | Ambrose et al. |

(Continued)

OTHER PUBLICATIONS

Notice of Allowance from U.S. Appl. No. 13/886,200, dated Jun. 18, 2014.

(Continued)

*Primary Examiner* — Jeffrey A Burke
*Assistant Examiner* — Thong Vu
(74) *Attorney, Agent, or Firm* — Zilka-Kotab, PC (57) ABSTRACT

In accordance with embodiments, there are provided mechanisms and methods for sharing a single instance of a database stored using a tenant of a multi-tenant on-demand database system. These mechanisms and methods for sharing a single instance of a database stored using a tenant of a multi-tenant on-demand database system can provide a single instance of a database that is shared amongst tenants of a multi-tenant on-demand database system. The ability to provide a single instance of a database that is shared amongst tenants of a multi-tenant on-demand database system can enable the database to be managed or otherwise maintained in a central location.

22 Claims, 6 Drawing Sheets

(56) References Cited

U.S. PATENT DOCUMENTS

| | | | |
|---|---|---|---|
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,209,929 B2 | 4/2007 | Dominguez, Jr. et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,779,039 B2 | 8/2010 | Weissman et al. | |
| 7,865,521 B2 | 1/2011 | Bird et al. | |
| 8,001,611 B2 | 8/2011 | Nelson et al. | |
| 8,015,495 B2 | 9/2011 | Achacoso et al. | |
| 8,073,724 B2 | 12/2011 | Harthcryde et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,271,536 B2 * | 9/2012 | Amradkar et al. | 707/802 |
| 8,275,836 B2 | 9/2012 | Beaven et al. | |
| 8,457,545 B2 | 6/2013 | Chan | |
| 8,478,782 B1 | 7/2013 | Kuruganti et al. | |
| 8,484,111 B2 | 7/2013 | Frankland et al. | |
| 8,560,571 B1 | 10/2013 | Kuruganti et al. | |
| 8,868,605 B2 | 10/2014 | Kuruganti et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0161602 A1 | 10/2002 | Dougherty et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0223022 A1 | 10/2005 | Weissman et al. | |
| 2005/0283478 A1 | 12/2005 | Choi et al. | |
| 2006/0021019 A1 | 1/2006 | Hinton et al. | |
| 2006/0206834 A1 | 9/2006 | Fisher et al. | |
| 2008/0010243 A1 | 1/2008 | Weissman et al. | |
| 2008/0162491 A1 * | 7/2008 | Becker et al. | 707/10 |
| 2008/0249972 A1 | 10/2008 | Dillon | |
| 2009/0025063 A1 | 1/2009 | Thomas | |
| 2009/0030906 A1 | 1/2009 | Doshi et al. | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2009/0282045 A1 * | 11/2009 | Hsieh et al. | 707/9 |
| 2010/0077214 A1 | 3/2010 | Jogand-Coulomb et al. | |
| 2011/0099621 A1 * | 4/2011 | Lizarraga et al. | 726/13 |

(56) References Cited

U.S. PATENT DOCUMENTS

| | | |
|---|---|---|
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0246475 A1 | 9/2013 | Kuruganti et al. |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0006583 A1 | 1/2015 | Kuruganti et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |

OTHER PUBLICATIONS

Non-Final Office Action from U.S. Appl. No. 13/886,200, dated Feb. 13, 2014.

Non-Final Office Action from U.S. Appl. No. 14/490,579, dated Apr. 1, 2015.

\* cited by examiner

SYSTEM, METHOD AND COMPUTER PROGRAM PRODUCT FOR SHARING A SINGLE INSTANCE OF A DATABASE STORED USING A TENANT OF A MULTI-TENANT ON-DEMAND DATABASE SYSTEM

CLAIM OF PRIORITY

This application is continuation of U.S. application Ser. No. 13/021,669, filed Feb. 4, 2011, which claims the benefit of U.S. Provisional Patent Application No. 61/309,312, filed Mar. 1, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to databases utilized by multiple tenants in a multi-tenant on-demand database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional multi-tenant on-demand database systems, each tenant owns the data and applications that they utilize and a database that is required to be shared among multiple tenants will require storing a copy of the database for each tenant. Unfortunately, various limitations are associated with establishing separate copies of a single database. For example, when a required update is to be made to the database, the updated data and update process must be provided to each copy of the database.

Accordingly, it is desirable to provide techniques enabling sharing of a single instance of a database to improve performance and efficiency of the database system.

BRIEF SUMMARY

In accordance with embodiments, there are provided mechanisms and methods for sharing a single instance of a database stored using a tenant of a multi-tenant on-demand database system. These mechanisms and methods for sharing a single instance of a database stored using a tenant of a multi-tenant on-demand database system can enable embodiments to provide a single instance of a database that is shared amongst tenants of a multi-tenant on-demand database system. The ability of embodiments to provide a single instance of a database that is shared amongst tenants of a multi-tenant on-demand database system can enable the database to be managed or otherwise maintained in a central location.

In an embodiment and by way of example, a method for sharing a single instance of a database stored using a tenant of a multi-tenant on-demand database system is provided. In use, a single instance of a database is stored using a first tenant of a multi-tenant on-demand database system. Further, access to the single instance of the database is provided to at least one second tenant of the multi-tenant on-demand database system.

While one or more implementations and techniques are described with reference to an embodiment in which sharing a single instance of a database stored using a tenant of a multi-tenant on-demand database system is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for sharing a single instance of a database stored using a tenant of a multi-tenant on-demand database system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing sharing a single instance of a database stored using a tenant of a multi-tenant on-demand database system will be described with reference to example embodiments.

Figure 1:
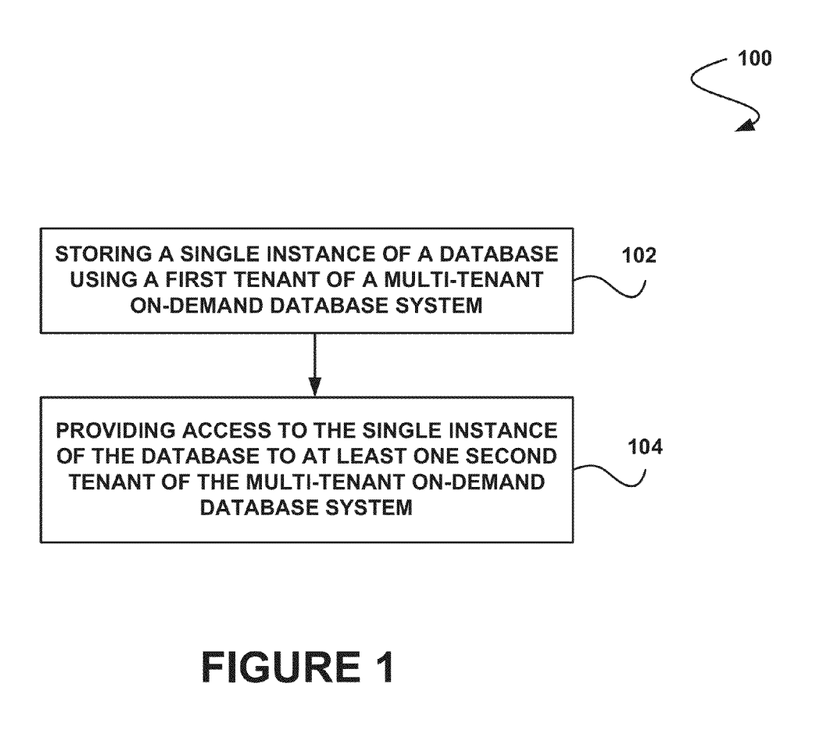
FIG. 1 illustrates a method for sharing a single instance of a database stored using a tenant of a multi-tenant on-demand database system, in accordance with an embodiment.

FIG. 1 illustrates a method 100 for sharing a single instance of a database stored using a tenant of a multi-tenant on-demand database system, in accordance with an embodiment. As shown in operation 102, a single instance of a database is stored using a first tenant of a multi-tenant on-demand database system. As noted above, the multi-tenant on-demand database system includes a system that relies on a database system that is accessible over a network, in which various elements of hardware and software of the database system may be shared by one or more customers (e.g. tenants). Various examples of such a multi-tenant on-demand database system will be set forth in the context of different embodiments that will be described during reference to subsequent figures.

To this end, the first tenant by which the single instance of the database is stored may optionally include a customer of the multi-tenant on-demand database system. As another option, the first tenant may solely be configured for use in storing the single instance of the database. For example, the first tenant may use various tools, applications, etc. of the multi-tenant on-demand database system to store, maintain, manage, etc. the single instance of the database. In one embodiment, the single instance of the database may be stored in a location in memory of the multi-tenant on-demand database system that is dedicated to (e.g. for use by) the first tenant, such that the single instance of the database is stored using the first tenant.

Additionally, the aforementioned database may include any data structure storing a data set. In one embodiment, the database may include at least one table. In another embodiment, the data structure may store reference data. Such reference data may include diagnostic codes for medical diagnoses, drug data (e.g. showing known drug interactions with allergies or other drugs), billing codes, pricelists, a product catalog, contact information, etc. As an option, the reference data stored in the database may change over time (e.g. via updates, etc.).

As noted above, a single instance of the database is stored using the first tenant of the multi-tenant on-demand database system. For example, components making up the database may be stored only once. In this way, multiple copies of the database may not necessarily be stored, the reasons for which will be set forth below in more detail.

Further, as shown in operation 104, access to the single instance of the database is provided to at least one second tenant of the multi-tenant on-demand database system. In one embodiment, the single instance of the database may be provided to only a single second tenant. In another embodiment, the single instance of the database may be provided to a plurality of different second tenants, such that the various second tenants share the single instance of the database.

It should be noted that the access provided to the second tenant may include any type of access by which the second tenant is allowed to retrieve data in the database for optionally performing subsequent operations on the data. Just by way of example, the second tenant may perform queries on the database for retrieving the data stored therein. As an option, the queries may be performed utilizing an interface [e.g. graphical user interface (GUI)] stored with respect to the first tenant or second tenant.

As an option, where the database stores reference data, such data may be un-editable by the second tenant. For example, the access may include read-only access. Accordingly, where the single instance of the database is shared among a plurality of different second tenants, the second tenants may be prevented from changing data stored in the database for ensuring the integrity of the data in the database.

In one embodiment, the single instance of the database may be published by the first tenant for use by the second tenant. Thus, in such embodiment, the second tenant may subscribe to the single instance of the database (e.g. via registration of the second tenant to the database). For example, the second tenant may gain access to the single instance of the database via the subscription. Optionally, such subscription may allow the second tenant to be automatically notified of the most recent update to the database (e.g. via a login screen of the second tenant for accessing the database or a setting or data status/update report to which the subscriber has access). In another embodiment, where the single instance of the database is stored in a location in memory of the multi-tenant on-demand database system that is dedicated to the first tenant, providing access to the single instance of the database to the second tenant may include providing the second tenant with access to such location in memory.

As an option, the access to the single instance of the database may be controlled, for example, by the first tenant. In one embodiment, the access may optionally only be provided to the second tenant in response to a determination that the second tenant is authorized to access the single instance of the database. For example, the authorization may be determined by determining that an internet protocol (IP) address, token, or identifier (e.g. user name, user ID, tenant ID) utilized by the second tenant (e.g. to request the access) is predetermined to be allowed to access the single instance of the database. In another embodiment, the access may optionally only be provided to the second tenant in response to a determination that the access request meets predetermined criteria (e.g. is within a time period in which access to the database is predetermined to be allowed, etc.).

Further, by identifying the second tenant (e.g. via IP address or token), each access by the second tenant to the single instance of the database may be logged. As another option, identification of the second tenant may allow rate limiting to be applied to each separate second tenant. The rate limiting may be accomplished by allowing a predetermined number of access attempts by a second tenant with respect to the single instance of the database (e.g. thus preventing denial of service attacks or other unwanted extensive resource consumption by a single second tenant).

Figure 2:
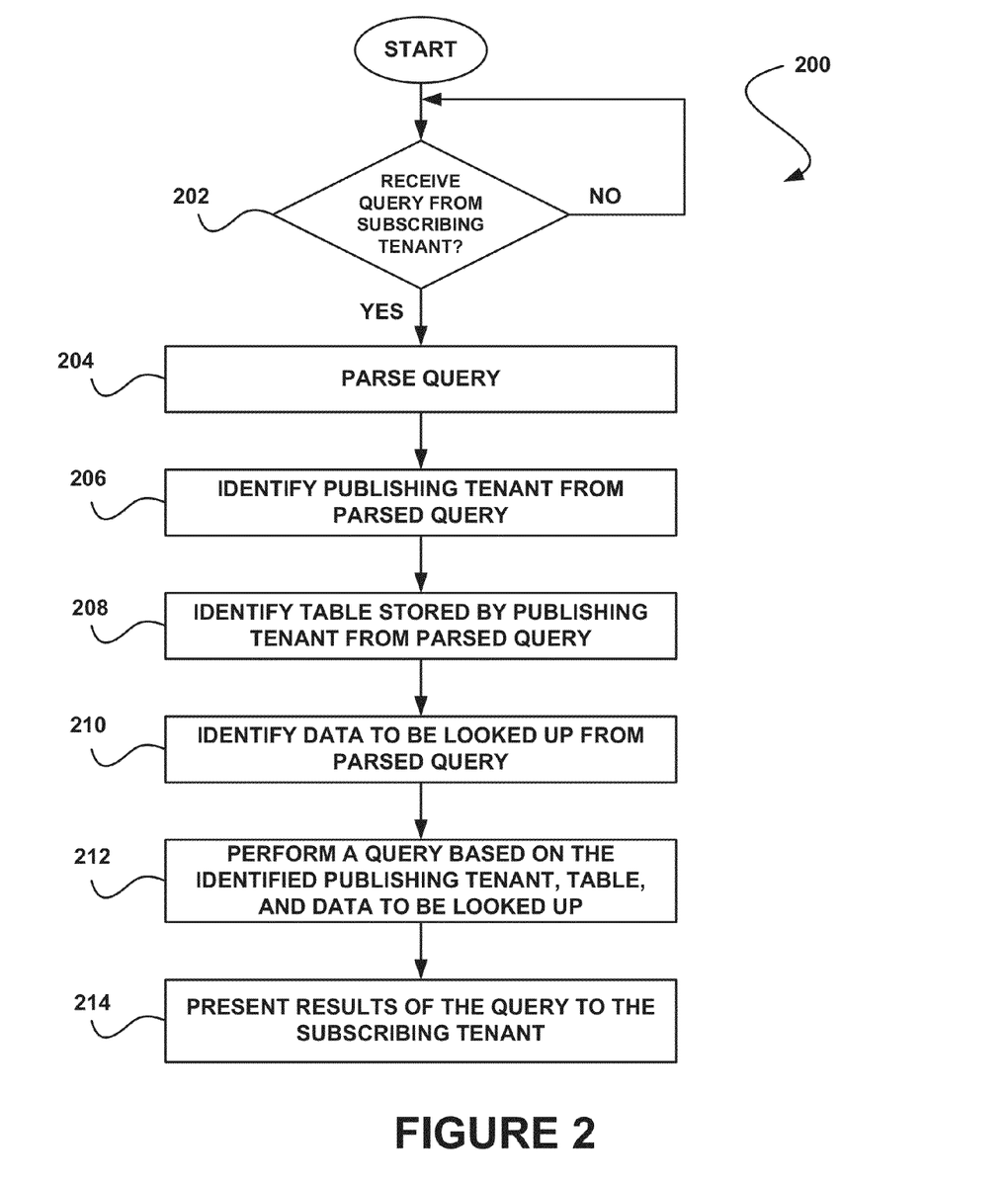
FIG. 2 illustrates a method for querying a single instance of a database shared among a plurality of tenants of a multi-tenant on-demand database system, in accordance with an embodiment.

By storing a single instance of a database using the first tenant for access by the second tenant, the single instance of a database may be capable of being shared among tenants of the multi-tenant on-demand database system. This may provide a centralization of the database, and thus eliminate the requirement for multiple copies of the database from existing within the multi-tenant on-demand database system (e.g. a copy stored by each of the second tenants). Accordingly, when an update to the database is to be made, the update may be made to the single instance of the database instead of each of a plurality of copies of the database, FIG. 2 illustrates a method 200 for querying a single instance of a database shared among a plurality of tenants of a multi-tenant on-demand database system, in accordance with an embodiment. As an option, the present method 200 may be carried out in the context of the functionality of FIG. 1. For example, the query may be carried out by the first tenant used to store a single instance of a database, as described above with reference to FIG. 1. Of course, however, the method 200 may be carried out in any desired environment. The aforementioned definitions may apply during the present description.

As shown in decision 202, it is determined whether a query is received from a subscribing tenant. With respect to the present embodiment, the subscribing tenant includes a tenant of a multi-tenant on-demand database system that has subscribed (e.g. has access to) an instance of a database stored by another tenant (hereinafter publishing tenant) of the multi-tenant on-demand database system. For example, the subscribing tenant may include the second tenant described above with respect to FIG. 1.

Accordingly, the query is a query to the database stored by the publishing tenant. If it is determined that a query is not received from a subscribing tenant, the method 200 continues to wait for a query to be received. In response to a determination that a query has been received, the query is parsed. Note operation 204.

For example, the query may include multiple components, such that parsing may identify each of the components. In one embodiment, the query may include a string entered by a user associated with the subscribing tenant. Such string may include data to be looked up in the database. As an option, the string may be entered in an interface utilized by the user to query the single instance of the database. Such interface may be provided in a package that is installed on the subscribing tenant and that brings with it logic to query the database.

In another embodiment, query may include data automatically generated by the interface utilized by the user to enter the string. For example, the data may include an identifier of the publishing tenant, an identifier of the database, an identifier of a table in the database, a data service to be utilized to look up the string in the table, etc. Optionally, the automatically generated data may be generated based on a database selected by the user in which the string is to be looked up (e.g. and the data service associated therewith).

Table 1 illustrates one example of a query and its various components. It should be noted that the query shown in Table 1 is set forth for illustrative purposes only, and thus should not be construed as limiting in any manner.

TABLE 1 https://data.secure.force.com/
codeLookupjson?table=cpt_codes_c&q=head publishing tenant is specified as "data.secure.force.com", this is the same for any type of data that must be published
data service used to perform the access is "codeLookup"
the data table to access is specified using the "table" parameter
the data string to be looked up is specified using the "q" parameter As shown in operation 206, the publishing tenant is identified from the parsed query. Further, a table stored by the publishing tenant is identified from the parsed query (note operation 208). Still yet, data to be looked up is identified from the parsed query (note operation 210).

Moreover, a query is performed based on the identified publishing tenant, table, and data to be looked up, as shown in operation 212. For example, the identified data service may use the identified publishing tenant, table, and data to be looked up to perform the query. In this way, the query may be performed based on the parsing. In various embodiments, the query may include a single query to multiple queries, based on the configuration of the single instance of the database.

Table 2 shows an example of a Salesforce.com™ Object Query Language (SOQL) query that may be performed in response to parsing of a query received from the subscribing tenant. Again, it should be noted that the query shown in Table 2 is set forth for illustrative purposes only, and thus should not be construed as limiting in any manner.

TABLE 2

```
} else if (tableName.equals('diagcode_c') ) {
    List <DiagCode_c> icds = [ select id,name,description_c
            from DiagCode_c
            where Description_c like :term
            or Name like :term
            limit :maxResult];
    for ( DiagCode_c i: icds) {
        result r = new result( );
        r.code = i.name;
        r.description = i.Description_c;
        results.add( r );
    }
}
```

Still yet, results of the query are presented to the subscribing tenant. Note operation 214. For example, the publishing tenant may perform the query and return the results to the subscribing tenant. As an option, the results may be formatted for presentation thereof to the subscribing tenant.

Table 3 illustrates code for formatting results of a query in Extensible Markup Language (XML). In Table 3, the results are shown as "!allresults". Again, it should be noted that the code shown in Table 3 is set forth for illustrative purposes only, and thus should not be construed as limiting in any manner.

TABLE 3

```
<apex:page contenttype="text/xml"  controller="codeLookup"  ><data >
<apex:repeat value="{!allresults}" var="e" >
<result>{!e.code} - {!e.description}</result>
</apex:repeat>
</data>
</apex:page>
```

Furthermore, Table 4 shows formatted results of a query. Yet again, it should be noted that the results shown in Table 4 is set forth for illustrative purposes only, and thus should not be construed as limiting in any manner.

TABLE 4

Figure 3A:
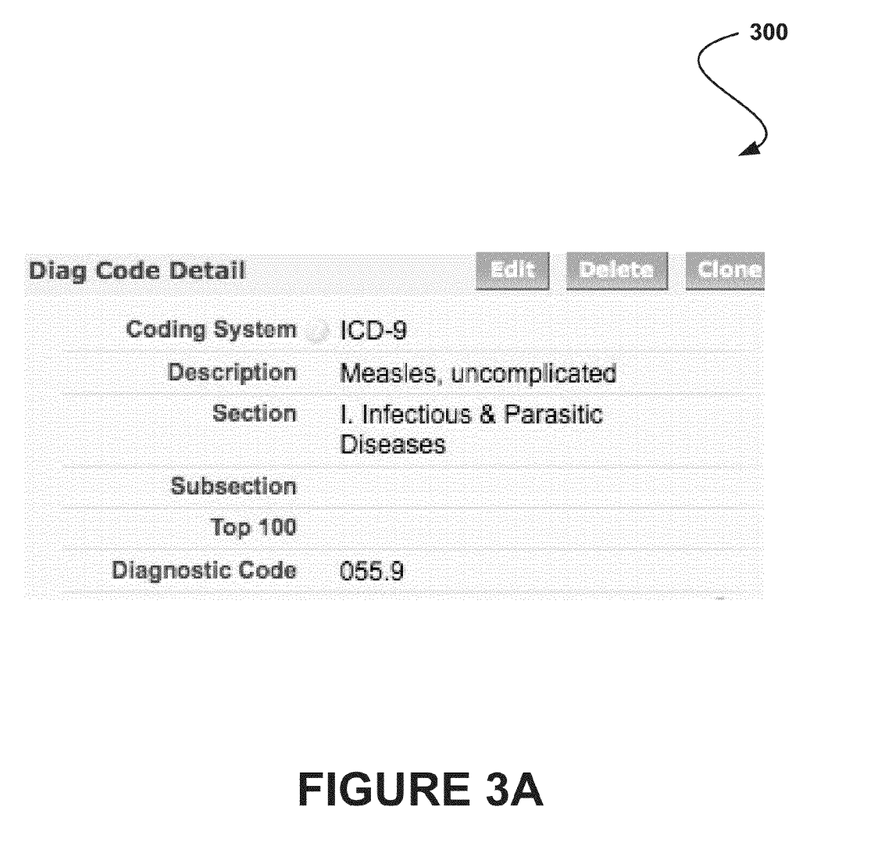
FIG. 3A illustrates a graphical user interface (GUI) presenting a record in a database shared among a plurality of tenants of a multi-tenant on-demand database system, in accordance with an embodiment.

[{id:"00100",text:"Anesthesia for procedures on integumentary system of head and/or salivary glands, including biopsy; not otherwise specified.",imageClass:"none",href:"",extra:""},{id:"00102", ext:"Anesthesia for procedures on integumentary system of head and/or salivary glands, including biopsy; plastic repair of cleft lip.",imageClass:"none",href:"",extra:""}, FIG. 3A illustrates a GUI 300 presenting a record in a database shared among a plurality of tenants of a multi-tenant on-demand database system, in accordance with an embodiment. As an option, the present GUI 300 may be implemented in the context of the functionality of FIG. 1-2. For example, the GUI 300 may be presented to a publishing tenant configuring the database. Of course, however, the GUI 300 may be implemented in any desired environment. Again, the aforementioned definitions may apply during the present description.

As shown, the record of the database is for a medical diagnosis code. The medical diagnosis code may be matched to a medical diagnosis. Thus, in the present embodiment, the record includes a description of the medical diagnosis associated with the code. The database may store a plurality of different medical diagnosis codes.

Figure 3B:
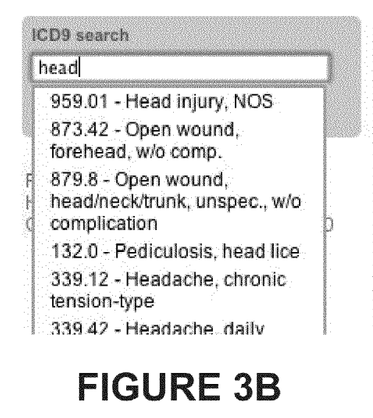
FIGS. 3B-D illustrate a GUI presenting a type-ahead feature utilizing a lookup in a database shared among a plurality of tenants of a multi-tenant on-demand database system, in accordance with an embodiment.
Figure 3C:
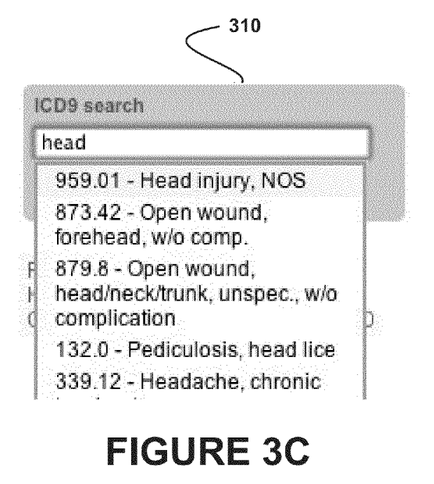
Figure 3D:
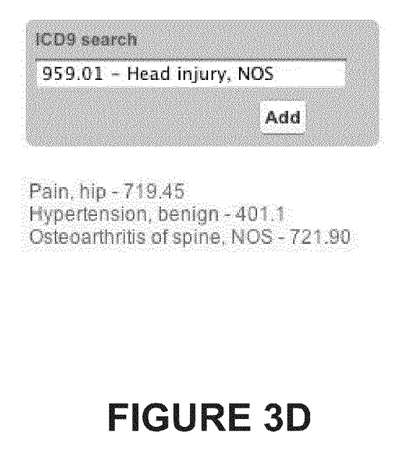

FIGS. 3B-D illustrate a GUI presenting a type-ahead feature utilizing a lookup in a database shared among a plurality of tenants of a multi-tenant on-demand database system, in accordance with an embodiment. As an option, the present GUI may be implemented in the context of the functionality of FIG. 1-3A. For example, the GUI may be presented to a subscribing tenant accessing the database. Of course, however, the GUI may be implemented in any desired environment. Again, the aforementioned definitions may apply during the present description.

As shown in FIG. 3B, a user associated with a subscribing tenant enters a string "head" in a field of the GUI. The string acts as a query to the database, for querying the database for records matching the string. Thus, upon receipt of the string the query is automatically generated and communicated to the publishing tenant storing the database. The query may include the query described above with respect to decision 202 of FIG. 2.

Upon receipt of the query the publishing tenant parses the query to identify components of the query (e.g. string to be looked up, table in which to look up string, etc.) and performs a query on the database using the components. Results of the query are formatted and returned to the subscribing tenant, as shown in FIG. 3B as the drop down list. To this end, where the string entered by the user is a partial name or other value in a field of one or more records, a result may be formatted and returned for each of such records for selection by the user (selection shown in FIG. 3C as highlighted item in drop down list). In one embodiment, the result may include a name of the record or any other value in a field of the record. As a result of the selection by the user, the selected item from the drop down list is automatically entered into the field of the GUI.

In this way, a lookup feature may be provided to the subscribing tenant so that a user (e.g. doctor) can simply type a value in a lookup field ("head" as shown) and get a complete listing of matching diagnoses stored in the database from which the user may select. Upon selecting the diagnosis from the listed results, the name and description may be recorded in a record of a database stored by the subscribing tenant. For example, the GUI may be displayed to edit a record of a database stored by the subscribing tenant, such that selection of one of the results displayed via the GUI may result in the record or portion thereof associated with the result being stored in another record of the database stored by the subscribing tenant.

System Overview

Figure 4:
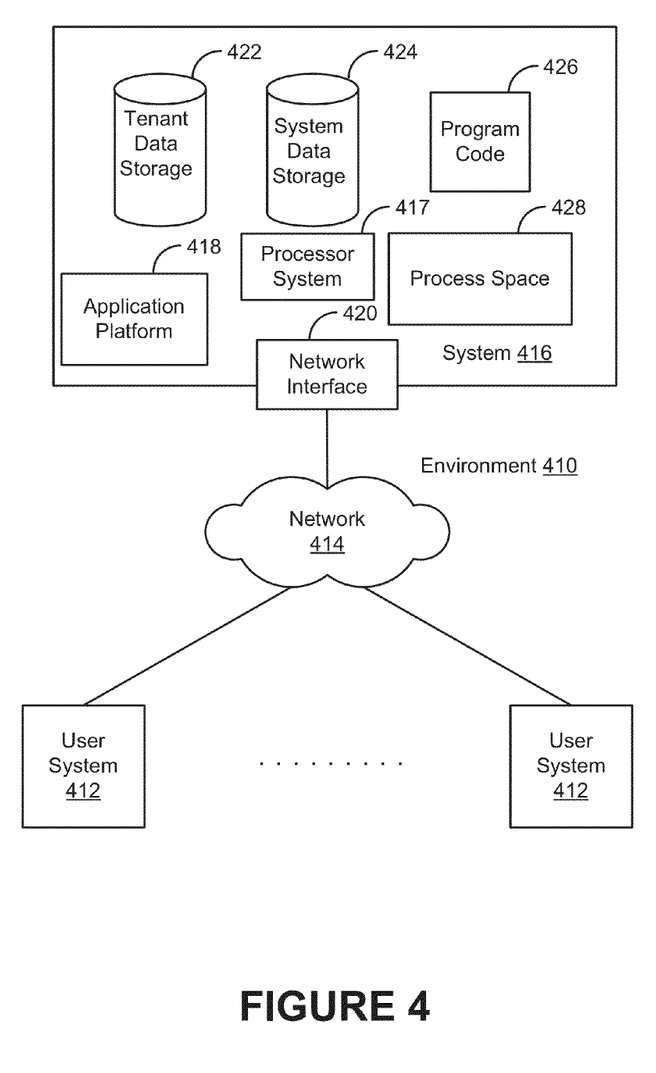
FIG. 4 illustrates a block diagram of an example of an environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used, (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
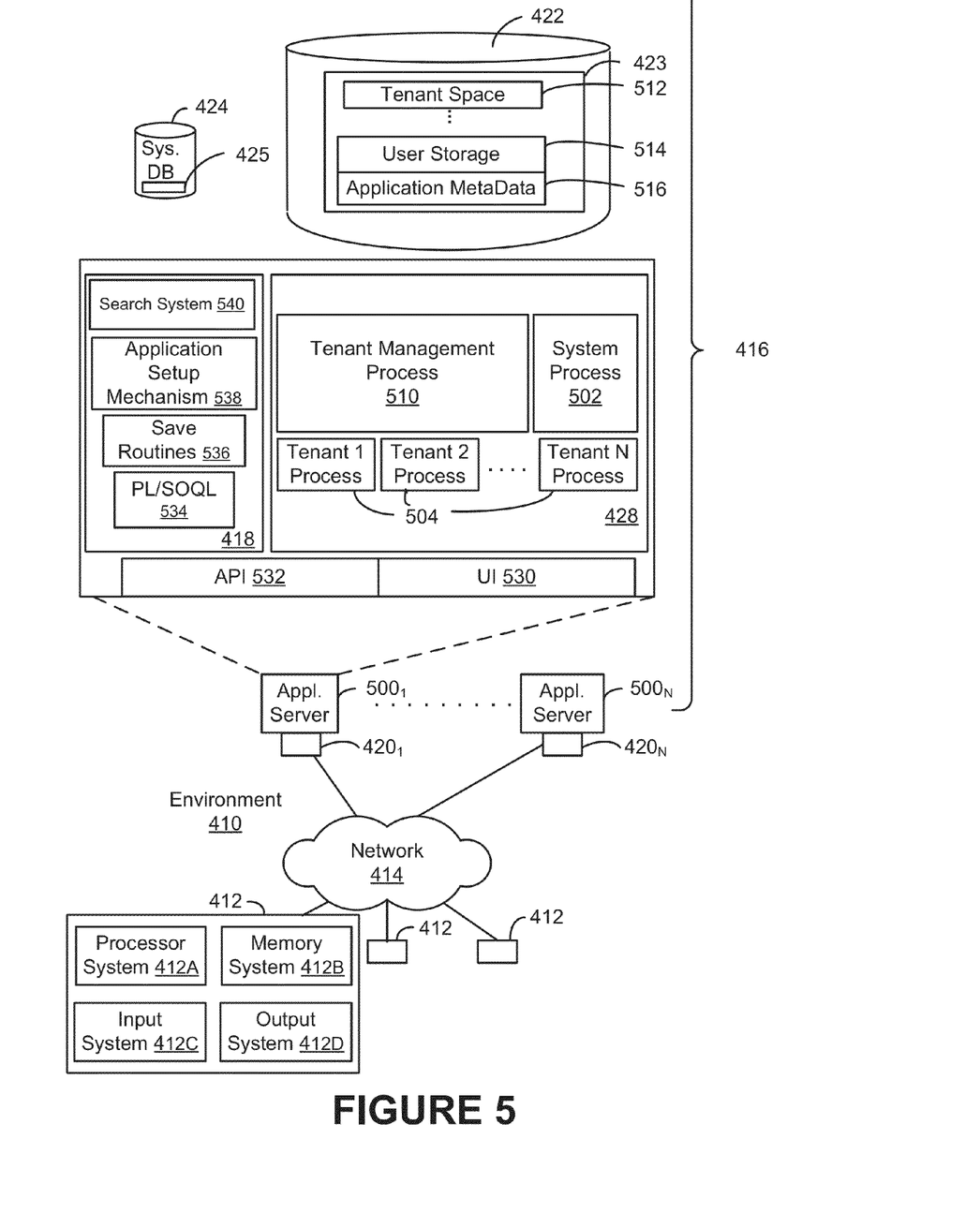
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input, system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output, system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/1P) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multitenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product embodied on a non-transitory computer readable medium, the computer program product including computer code adapted to be executed by a computer to perform a method comprising:
  storing a database used by a first tenant of a multi-tenant on-demand database system by storing the database in a location in memory of the multi-tenant on-demand database system that is dedicated to only the first tenant; and
  allowing at least one second tenant of the multi-tenant on-demand database system to access the database, such that:
    the at least one second tenant of the multi-tenant on-demand database system is allowed to perform one or more queries on the database for retrieving data stored in the database,
    the first tenant is able to alter data stored in the database, and
    the at least one second tenant is prevented from altering the data stored in the database.

2. The computer program product of claim 1, wherein the computer program product is operable such that the database is published by the first tenant for use by the at least one second tenant.

3. The computer program product of claim 1, wherein the database includes at least one table.

4. The computer program product of claim 1, wherein the computer program product is operable such that the database stores reference data that is un-editable by the at least one second tenant.

5. The computer program product of claim 1, wherein the access includes read-only access.

6. The computer program product of claim 1, wherein the computer program product is operable such that the access is provided to the at least one second tenant in response to a determination that the at least one second tenant is authorized to access the database.

7. The computer program product of claim 6, wherein the computer program product is operable such that it is determined that the at least one second tenant is authorized to access the database by determining that an internet protocol (IP) address utilized by the at least one second tenant is predetermined to be allowed to access the database.

8. The computer program product of claim 1, further comprising receiving a query from the at least second tenant.

9. The computer program product of claim 8, wherein the query includes a string entered by a user associated with the at least one second tenant.

10. The computer program product of claim 9, wherein the string includes data to be looked up in the database.

11. The computer program product of claim 9, wherein the query further includes data automatically generated by an interface utilized by the user to enter the string.

12. The computer program product of claim 11, wherein the data includes an identifier of the first tenant, an identifier of the database, and a data service to be utilized to look up the string in the table.

13. The computer program product of claim 8, further comprising parsing the query.

14. The computer program product of claim 13, further comprising performing the query based on the parsing.

15. The computer program product of claim 14, further comprising returning results of the query to the at least one second tenant.

16. The computer program product of claim 1, wherein the multi-tenant on-demand database system stores tenant-specific data for each of the first tenant and the at least one second tenant, and wherein the tenant-specific data of the first tenant including the database is stored by the multi-tenant on-demand database system logically separate from the tenant-specific data of the at least one second tenant, such that:
   access by the first tenant to the tenant-specific data of the at least one second tenant is prevented unless the tenant-specific data of the at least one second tenant is expressly shared, and
   access by the at least one second tenant to the tenant-specific data of the first tenant including the database is only allowed by virtue of the tenant-specific data of the first tenant including the database being expressly shared.

17. The computer program product of claim 1, wherein each of the one or more queries on the database performed by the at least one second tenant of the multi-tenant on-demand database system include:
   an identification of the first tenant;
   an identification of a data service used to perform the query;
   a data table within the database to access to perform the query; and
   a data string to look up within the database.

18. The computer program product of claim 1, wherein allowing the at least one second tenant of the multi-tenant on-demand database system to access the database is responsive to the at least one second tenant subscribing to the database via a registration of the at least one second tenant to the database.

19. The computer program product of claim 1, wherein allowing the at least one second tenant of the multi-tenant on-demand database system to perform one or more queries on the database for retrieving data stored in the database includes:
   receiving from the at least one second tenant a string including data to be looked up and a selection of the database in which the data is to be looked up,
   automatically generating a query that includes an identifier of the first tenant, an identifier of the selected database, an identifier of a table in the selected database, and a data service associated with the selected database to be utilized to look up the string entered by the at least one second tenant in the table of the selected database, and performing the generated query.

20. A method, comprising:
   storing a database used by a first tenant of a multi-tenant on-demand database system by storing the database in a location in memory of the multi-tenant on-demand database system that is dedicated to only the first tenant; and
   allowing at least one second tenant of the multi-tenant on-demand database system to access the database, such that:
      the at least one second tenant of the multi-tenant on-demand database system is allowed to perform one or more queries on the database for retrieving data stored in the database,
      the first tenant is able to alter data stored in the database, and
      the at least one second tenant is prevented from altering the data stored in the database.

21. An apparatus, comprising:
   a hardware processor for:
      storing a database used by a first tenant of a multi-tenant on-demand database system by storing the database in a location in memory of the multi-tenant on-demand database system that is dedicated to only the first tenant; and
      allowing at least one second tenant of the multi-tenant on-demand database system to access the database, such that:
         the at least one second tenant of the multi-tenant on-demand database system is allowed to perform one or more queries on the database for retrieving data stored in the database,
         the first tenant is able to alter data stored in the database, and
         the at least one second tenant is prevented from altering the data stored in the database.

22. A method for transmitting code, comprising:
   transmitting code to store a database used by a first tenant of a multi-tenant on-demand database system by storing the database in a location in memory of the multi-tenant on-demand database system that is dedicated to only the first tenant; and
   transmitting code for allowing at least one second tenant of the multi-tenant on-demand database system to access the database, such that:
      the at least one second tenant of the multi-tenant on-demand database system is allowed to perform one or more queries on the database for retrieving data stored in the database,
      the first tenant is able to alter data stored in the database, and
      the at least one second tenant is prevented from altering the data stored in the database.

* * * * *